United States Patent [19]

Huss

[11] Patent Number: 4,619,376

[45] Date of Patent: Oct. 28, 1986

[54] BINGO CHIP DISPENSER

[76] Inventor: Clifford A. Huss, 1766 Hull Rd., Twining, Mich. 48766

[21] Appl. No.: 699,562

[22] Filed: Feb. 8, 1985

[51] Int. Cl.[4] .......... B65G 59/00; B65H 3/00; B65D 5/72

[52] U.S. Cl. .......... 221/243; 221/264; 221/274; 221/276; 222/473; 222/474

[58] Field of Search .......... 221/264, 268, 272, 274, 221/271, 243, 263, 276; 133/5 A, 5 R; 222/473, 474

[56] References Cited

U.S. PATENT DOCUMENTS

| | | | |
|---|---|---|---|
| 1,607,530 | 11/1926 | Guest | 222/473 X |
| 1,719,826 | 7/1929 | Aldrich | 221/274 X |
| 3,062,349 | 11/1962 | Nauman et al. | 221/243 |
| 3,998,238 | 12/1976 | Nigro | 133/5 A |
| 4,146,151 | 3/1979 | Davis | 221/264 |
| 4,216,878 | 8/1980 | Naud | 221/264 |
| 4,535,913 | 8/1985 | Hooie et al. | 133/5 A X |

FOREIGN PATENT DOCUMENTS

| | | | |
|---|---|---|---|
| 147576 | 10/1950 | Australia | 222/474 |
| 57165 | 1/1940 | Denmark | 133/5 R |

*Primary Examiner*—F. J. Bartuska
*Assistant Examiner*—Gregory L. Huson
*Attorney, Agent, or Firm*—John J. Swartz

[57] ABSTRACT

Chip dispensing apparatus for dispensing bingo chips with a chip transfer slide which is reciprocally moveable between a chip receiving position to receive the lowermost chip from a stack of chips received in an elongate upstanding tube and a laterally removed chip dispensing position in which a chip is dispensed to a bingo card. The apparatus includes a pistol grip-type handle having a linkage which is coupled to the chip transfer slide and actuated by a trigger to reciprocally move the chip transfer slide between the chip receiving and chip dispensing positions.

2 Claims, 5 Drawing Figures

BINGO CHIP DISPENSER

BACKGROUND OF THE INVENTION

1. Field of the Invention

This invention relates to apparatus for dispensing bingo chips and more particularly to bingo chip dispensing apparatus having new and novel mechanism for sequentially discharging the lowermost chip in a stack of individual, vertically stacked bingo chips.

2. Description of the Prior Art

The game of bingo is well known and is traditionally played by placing objects on selected numbers printed on a bingo card. The objects utilized to "cover" the bingo card numbers have included various items such as pieces of paper and corn kernels. More recently, cylindrical disks or chips have been utilized by bingo players.

Various devices have been provided heretofore for dispensing such chips as that disclosed in U.S. Pat. No. 4,146,151 issued to Edward H. Davis on Mar. 27, 1979.

Other patents which are directed to the concept of dispensing disks, chips, and other objects include the following patents: U.S. Pat. Nos. 1,766,298 issued to G. B. Macke on Jun. 24, 1920; 2,280,443 issued to J. F. Murray Et Al on Apr. 21, 1942; 2,434,993 issued to H. V. Dwyer on Jan. 27, 1948; and 4,216,878 issued to Gaetan Naud on Aug. 12, 1980.

The game of bingo is frequently played by elderly individuals who have lost much of the dexterity, muscle control, and ability which is necessary to satisfactorily manipulate the small chips as well as the devices which have heretofore been provided for dispensing such chips. Accordingly, it is an object of the present invention to provide new and novel chip dispensing apparatus which is physically easier to manipulate and operate.

It is another object of the present invention to provide chip dispensing apparatus which can be easily operated by individuals having diminished strength, dexterity and finger control.

Yet another object of the present invention to provide chip dispensing apparatus of the type including a manually graspable handle having a finger actuated trigger which is coupled to a linkage for moving a chip receiving slide between a chip receiving position where it receives the lowermost chip in a stack of chips and a horizontally displaced chip releasing position where the chip is released.

Other objects and advantages of the present invention will become apparent to those of ordinary skill in the art as the description thereof proceeds.

SUMMARY OF THE INVENTION

Chip dispensing apparatus comprising an upstanding, elongate chip receiving chute for receiving and storing a stack of chips to be dispensed including an upper opening for receiving chips, and a lower opening through which chips may pass; mechanism for individually dispensing the lowermost chip in the stack of chips comprising a slide, having a chip receiving aperture therethrough; mechanism for reciprocally moving the slide between a chip receiving position in which the chip receiving aperture is aligned with the lower opening to receive the lowermost chip in said stack of chips and a laterally removed chip releasing position in which a chip received by the aperture is allowed to downwardly descend through the aperture while the balance of the stack is concurrently held in the chute by the slide comprising a handle for supporting the chute, a lever swingably mounted on the handle and being coupled to the slide, and a trigger swingably mounted on the handle and being coupled to the lever to swing the lever from the lever to move the slide in a to-and-fro reciprocal path of travel.

BRIEF DESCRIPTION OF THE DRAWINGS

The invention may be more readily understood by referring to the accompanying drawings, in which.

DESCRIPTION OF THE PREFERRED EMBODIMENT

Figures 1, 2, 3, 4, 5:
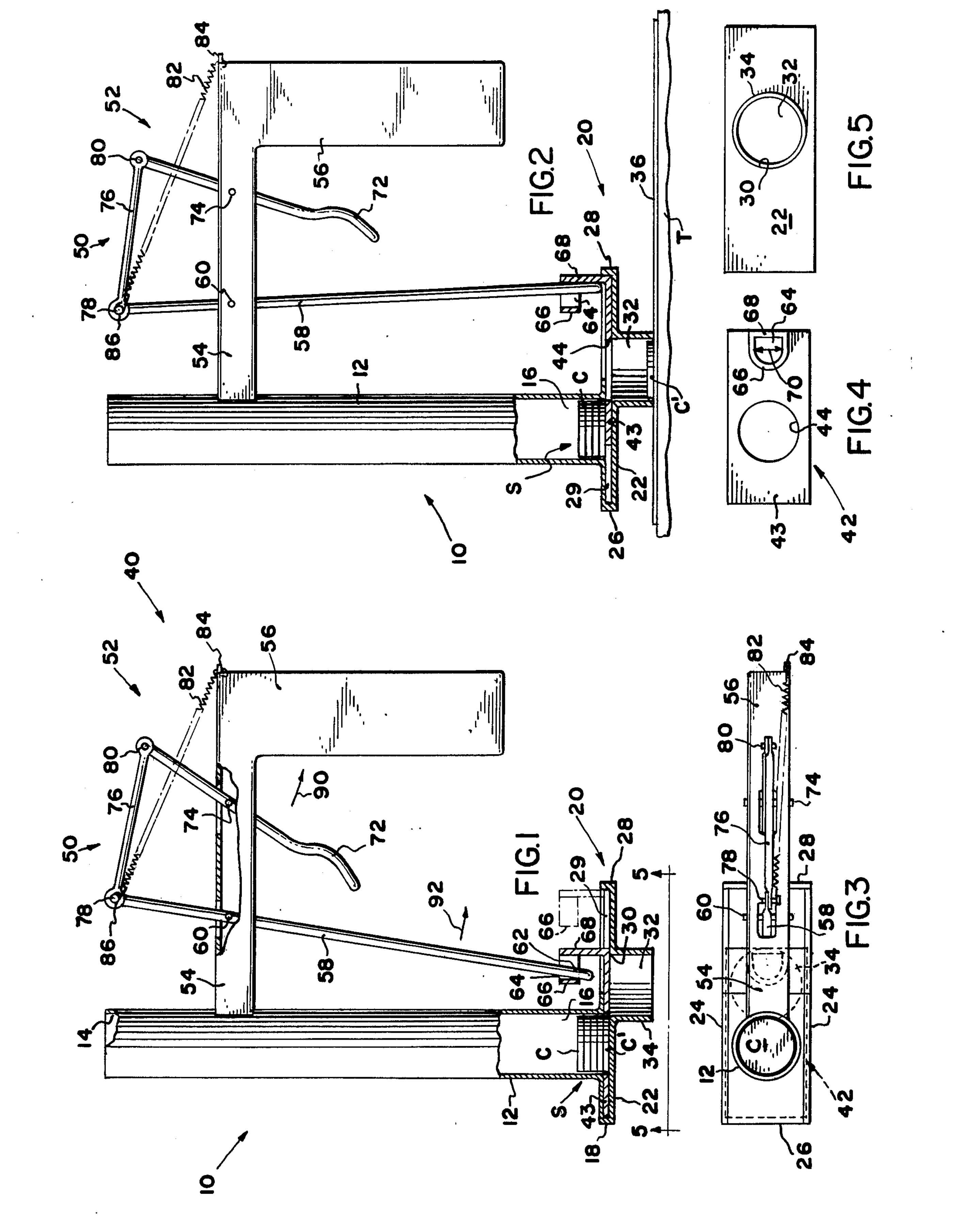
FIG. 1 is a side elevational view of chip dispensing apparatus constructed according to the present invention, part of the apparatus being broken away to more clearly illustrate the mechanism in a rest position in which the slide is in a forward position to receive the lowermost chip in a stack of chips.
FIG. 2 is a view similar to FIG. 1 but illustrating the mechanism in an adjusted position in which a chip is released.
FIG. 3 is a top plan view of the apparatus illustrated in FIG. 1.
FIG. 4 is a top plan view illustrating the slide only.
FIG. 5 is a bottom plan view taken along the line 5—5 of FIG. 1.

Apparatus constructed according to the present invention, generally designated 10, includes an elongate upstanding, hollow, cylindrical, chip receiving tube, generally designated 12, for receiving and storing a vertical stack S of individual thin cylindrical chips C. The tubular member 12 includes an upper opening 14 for receiving the chips C and a lower opening 16 through which the chips C may pass.

The tubular member 12 is mounted on the upper wall 18 of a horizontal guide, generally designated 20. The guide 20 includes a lower wall 22 parallel to the upper wall 18 and coupled thereto via a pair of vertical side walls 24 and opposite end walls 26 and 28. The walls 18, 22, 24, 26 and 28 define a horizontal guide slot 29 for a purpose to become immediately apparent.

The lower wall 22 includes an opening 30 therein in alignment with an opening 32 provided in a tube 34 dependently mounted on the bottom wall 22. As is clearly illustrated, the lower opening 30 is laterally offset from the upper opening 14. The tube 34 constitutes a guide chute for guiding the chips C to a bingo card 36 in a manner to be described more particularly hereinafter. As is illustrated, the bingo card 36 is supported via a table T.

Apparatus, generally designated 40, is provided for moving the lowermost chip C' from a position at the bottom of the stack, received in the discharge outlet 16 of tube 12, to a discharge position received by the opening 30 of tube 34 and includes a chip transfer slide, generally designated 42, having a chip receiving aperture 44 therethrough. As is illustrated in FIGS. 1 and 2, the chip transfer slide 42 is received in the slot 29 of guide 20 for movement between a chip receiving position, illustrated in FIG. 1, in which the lowermost chip is received in the opening 44 and a chip release position, illustrated in FIG. 2 in which a chip received in the aperture 44 is released to the tubular member 34.

As the slide 42 moves from the chip receiving position, illustrated in FIG. 1, to the chip discharging position, illustrated in FIG. 2, the lowermost chip C' is supported by bottom wall 22. The dimensions of the parts are such that the vertical thickness of the chips C is equal to the vertical thickness of the slide 42. The slide 42 includes a terminal end portion 43 to support the remaining chips in the stack S while the lowermost chip C′ is being transferred to the discharge chute 34.

Apparatus, generally designated 50, is provided for easily moving the slide 42 between the chip receiving and chip releasing positions, illustrated in FIGS. 1 and 2 respectively, and includes a pistol grip-type handle, generally designated 52, including a horizontal handle portion 54 mounted on the chip receiving tube 12 and a vertical handle portion 56 which can be gripped by the hand of the user.

The slide moving apparatus 50 includes a lever 58, pivotally mounted on the horizontal handle portion 54 via a pivot pin 60, having a lower end 62 which is received in an aperture 64 provided in a ring member 66 fixed to the slide 42 via an upstanding tang 68. As is evident in the drawing, the horizontal cross-sectional area, represented by the arrows 70, of the aperture 66 is substantially greater than the horizontal cross-sectional area of the lower lever portion 66 received thereby. This construction provides a limited lost motion connection between the lever 58 and the slide 42 and freely translates the swinging motion of lever 58 to the linear motion of slide 42.

A finger actuated trigger 72 is pivotally mounted on the handle portion 54 via a pivot pin 74 and is swingably coupled to the upper end of lever 58 via a linkage 76 and pivot pins 78 and 80.

A spring, 82, is fixed to the handle at 84 and is fixed to the lever 58 at 86 for retracting the slide 42 from the position illustrated in FIG. 2 to the position illustrated in FIG. 1 when the trigger 72 is released.

The trigger 72 when moved from the rest position illustrated in FIG. 1 to the discharge position illustrated in FIG. 2, will move the slide 42 from the chip receiving position illustrated in FIG. 1 to the chip discharging position illustrated in FIG. 2.

THE OPERATION

In operation, the user will place the bingo card 36 on a table T and load the apparatus 10 by placing a plurality of chips C in the tube 12 to form the stack S. When the stack S of chips C is received in the tube 12, the lowermost chip C′ will be received in the aperture 44.

When the operator wants to dispense a chip C onto the bingo card 36, he will align the chute 34 with the appropriate portion of the card and then actuate trigger 72 rearwardly in the direction of the arrow 90 causing the lower portion 62 of lever 58 to likewisely swing rearwardly in the direction of the arrow 92.

As the chip transfer slide 42 moves to the right, as illustrated in FIG. 1, the left terminal end portion 43 of the slide 42 will support the remaining chips C in the stack S above the just removed lowermost chip.

When the chip transfer slide 42 reaches the fully rearmost position as illustrated in FIG. 2, the aperture 44 is in vertical alignment with the opening 30 and thus the chip C′ will be released for descent via gravity to the bingo card 36 to the position illustrated in C′.

The operator need only release the trigger 72 and the spring 82 will return the chip transfer slide 42 to the chip receiving position where the next lowermost chip will be received in the aperture 44. The operation can then be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Chip dispensing apparatus comprising:

an upstanding, elongate, chip receiving chute for receiving and storing a stack of chips to be dispensed including;

an upper opening for receiving chips; and a lower opening through which chips may pass;

means for individually dispensing the lowermost chip in said stack of chips comprising:

slide means, having a chip receiving aperture therethrough, for receiving and laterally transferring the lowermost chip of said stack of chips;

means mounting said slide means for to-and-fro reciprocal movement between a chip receiving portion in which said chip receiving aperture is aligned with said lower opening and a laterally removed chip releasing position in which a chip received by said aperture is allowed to downwardly descend through said aperture while the balance of the stack is held in said chute by said slide means;

means for reciprocally moving said slide means between said chip receivng chip releasing positions comprising;

hand graspable handle means for supporting said chute means comprising a pistol grip handle including a horizontal handle portion mounted on said chute and a vertically disposed hand receiving terminal portion;

lever means swingably mounted on horizontal handle portion between said chute and said vertically disposed hand receiving terminal portion and having a lower end portion for coupling to said slide means, finger actuable trigger means swingably mounted on said horizontal handle portion of handle means between said lever means and said vertically disposed portion and being coupled to said lever means to swing said lever means from an inoperative position in which said slide means is in said chip receiving position and an operating position in which said slide means is in said chip discharging position; and means for retracting said trigger means from said operative position to said inoperative position;

downwardly depending guide means for receiving the released chip from said slide means and guiding it in a downward path of travel;

lost motion connection means coupling said lower end portion of said lever means to said slide means including a ring mounted on said slide means said ring including an aperture therethrough receiving said lower end portion of said lever means;

said aperture having a cross-sectional area substantially larger than the horizontal cross-sectional area of said lower end portion of the lever means received thereby.

2. The apparatus set forth in claim 1 wherein said means for individually dispensing the lowermost chip in said stack of chips comprises a horizontally disposed guide channel defining a horizontal guide slot receiving said slide means including;

an upper wall mounting said chute and having an opening therein aligned with said lower opening of said chute; and a lower wall spaced from said upper wall by a gap and mounting said depending guide means;

said lower wall including an opening therein vertically aligned with said guide means.

* * * * *